United States Patent
Okutani

(10) Patent No.: US 11,993,917 B2
(45) Date of Patent: May 28, 2024

(54) WORKING VEHICLE

(71) Applicant: TAKEUCHI MFG. CO., LTD., Nagano (JP)

(72) Inventor: Shumpei Okutani, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 151 days.

(21) Appl. No.: 17/849,868

(22) Filed: Jun. 27, 2022

(65) Prior Publication Data
US 2023/0039650 A1    Feb. 9, 2023

(30) Foreign Application Priority Data

Aug. 6, 2021    (JP) .................... 2021-130004

(51) Int. Cl.
*H02M 1/08*    (2006.01)
*E02F 9/20*    (2006.01)
*E02F 9/22*    (2006.01)

(52) U.S. Cl.
CPC ............ *E02F 9/207* (2013.01); *E02F 9/2242* (2013.01)

(58) Field of Classification Search
CPC ..... E02F 9/207; E02F 9/2242; H02P 2201/03; H02M 1/08
See application file for complete search history.

(56) References Cited

U.S. PATENT DOCUMENTS

| | | | |
|---|---|---|---|
| 10,472,805 B1 | 11/2019 | Kumeuchi et al. | |
| 2013/0030621 A1* | 1/2013 | Chung | B60L 3/04 |
| | | | 701/22 |
| 2017/0043758 A1 | 2/2017 | Cho | |
| 2019/0345695 A1 | 11/2019 | Kumeuchi et al. | |
| 2020/0021185 A1* | 1/2020 | Yamamura | H02M 1/08 |

FOREIGN PATENT DOCUMENTS

| | | |
|---|---|---|
| EP | 3 813 220 | 4/2021 |
| JP | 2000-116143 | 4/2000 |
| JP | 3289567 | 6/2002 |
| JP | 2008-2149370 | 9/2008 |
| JP | 2016-083977 | 5/2016 |

OTHER PUBLICATIONS

Notice of Reasons for Refusal dated Nov. 7, 2023 in Japanese Patent Application No. 2021-130004.
EPO Communication dated Dec. 13, 2023 in European application No. 22 179 068.6.
Extended European Search Report dated Nov. 25, 2022 in European Application No. 22179068.6.

* cited by examiner

*Primary Examiner* — Cortez M Cook
(74) *Attorney, Agent, or Firm* — Stephen J. Weyer, Esq.; Stites & Harbison, PLLC

(57) ABSTRACT

A working vehicle includes a drive unit having inverters, AC motors, hydraulic pumps, a battery, a controller, a battery management system, a switch, an electromagnetic contactor, and a display unit, and the switch is signal-connected to the controller, a stop signal is transmitted to the controller when the switch is turned off, and the controller performs stop control in which the AC motors are operated during a term to thereby set a residual voltage to be lower than a predetermined set voltage.

6 Claims, 4 Drawing Sheets

WORKING VEHICLE

CROSS-REFERENCE TO RELATED APPLICATION

This application is based upon and claims the benefit of priority of the prior Japanese Patent Application No. P2021-130004, filed on Aug. 6, 2021, and the entire contents of which are incorporated herein by reference.

TECHNICAL FIELD

The present invention relates to a working vehicle.

BACKGROUND ART

A system in which electric charge stored in an inverter after being disconnected from a battery is allowed to be consumed by an AC motor and a system of controlling discharge time of electric charge stored in the inverter in an electric vehicle have been proposed in the past (PTL: 1: Japanese Patent No. 3289567, PTL 2: JP-A-2016-083977). Moreover, a working vehicle in a system of being hydraulically driven by performing inverter control of the AC motor is known (PTL 3: Japanese Patent No. 6463537).

SUMMARY OF INVENTION

Technical Problem

As the working vehicle has a configuration in which large electric current flows in an electromagnetic contactor forming a DC power supply circuit from the battery to the inverter, there is a case where the inverter is not disconnected from the battery just after turning off a switch. Accordingly, in a related-art hydraulic working vehicle, there is a danger of receiving electric shock due to residual voltage of the inverter depending on a maintenance target at the time of performing maintenance after turning off the switch.

Solution to Problem

In response to the above issue, one or more aspects of the present invention are directed to a working vehicle with improved safety in maintenance as compared with related art by operating an AC motor during a term from a point when a switch is turned off until reaching a prescribed time.

In view of the above, the following embodiments are described below.

A working vehicle according to the present invention includes a drive unit having inverters, AC motors, and hydraulic pumps, a battery feeding direct current to the inverters, a controller signal-connected to the inverters, a battery management system signal-connected to the controller, a switch, an electromagnetic contactor operated by a command from the battery management system and connecting the battery to the inverters, and a display unit signal-connected to the controller, and the switch is signal-connected to the controller so as to transmit a stop signal, the electromagnetic contactor is controlled to be off by the battery management system and the stop signal is transmitted to the controller when the switch is turned off, and the controller having received the stop signal performs stop control in which the AC motors are operated during a term from a point when the switch is turned off until reaching a prescribed time to thereby set a residual voltage in the inverters at the point when reaching the prescribed time to be lower than a predetermined set voltage which has been previously set.

According to the above configuration, it is possible to prevent electric shock due to the residual voltage at the time of performing maintenance; therefore, the working vehicle with improved safety as compared with related art can be obtained.

It is preferable that, when the controller determines that the residual voltage is equal to or higher than the predetermined set voltage, the controller transmits a first error signal to the display unit, and the display unit having received the first error signal displays a first error indication. Here, a first term during which the first error indication being displayed is previously set. According to the configuration, it is possible to inform an operator or a worker of abnormality.

It is preferable that, when the controller determines that the residual voltage is equal to or higher than the predetermined set voltage, the controller transmits a second error signal to the display unit when the display unit is restarted, and the display unit having received the second error signal displays a second error indication. Here, a second term during which the second error indication being displayed is previously set. According to the configuration, it is possible to inform the operator or the worker of abnormality. As an example, the second term is a longer time than the first term. As an example, the second term and the first term may be the same length of time. As an example, the first error signal and the second error signal may be the same signal. As an example, the first error indication and the second error indication may be the same indication.

The residual voltage in the inverter is in proportion to a quantity of electric charge stored in a capacitor disposed on an output side of the inverter. Accordingly, the controller detects a quantity of electric charge stored in the capacitor at a point when the prescribed time has passed by a sensor and calculates the residual voltage from the detected quantity of electric charge. Alternatively, the controller detects the residual voltage in the capacitor at the point when the prescribed time has passed by a voltmeter. As described above, the controller monitors the residual voltage of the inverter. Then, the controller determines that the residual voltage is normal when the residual voltage at the point when the prescribed time has passed is lower than the predetermined set voltage. The controller determines that the residual voltage is abnormal when the residual voltage at the time when the prescribed time has passed is equal to or higher than the predetermined set voltage.

As an example, the term is set to 0.1 to 10.0 [seconds]. As an example, the term is set to 0.5 to 3.0 [seconds]. As an example, the predetermined set voltage of the residual voltage is set to an arbitrary value equal to or lower than 60 [V]. As an example, the term and the predetermined set voltage of the residual voltage is set by rewriting of an ECU.

An instruction rotational speed to the AC motor in the stop control by the controller may be lower than a rotational speed of the hydraulic pump at the time of driving the actuator, may be a rotational speed at the time of making the hydraulic pump in a standby state, or may be a minimum-required rotational speed to a degree in which the hydraulic pump does not fail, namely, may be equal to or higher than the minimum-required rotational speed to the degree in which the hydraulic pump does not fail. The instruction rotational speed to the AC motor and the rotational speed of the hydraulic pump may be synchronized to be the same as well as different through a transmission or the like. As an example, the instruction rotational speed to the AC motor is set to an arbitrary value within a range from 100 [min.-1] to 3000 [min.-1]. As a preferable example, the instruction rotational speed to the AC motor is set to an arbitrary value within a range from 100 [min.-1] to 1000 [min.-1]. Here, in a case where the AC motor includes a main motor and a sub-motor, the main motor may be set as a target for the stop control and the sub-motor may be excluded from the target for the stop control.

The controller can control the instruction rotational speed to the AC motor in the stop control. That is, the controller can control lowering of the residual voltage by combining the instruction rotational speed and the term. As an example, the instruction rotational speed is increased and the term is shortened. As an example, the term is elongated and the instruction rotational speed is reduced. Accordingly, lowering levels of the residual voltage can be controlled. As a result, lowering speed of the residual voltage can be controlled.

As an example, it is preferable that the switch is signal-connected to the controller so as to transmit a start signal, the electromagnetic contactor is controlled to be on by the battery management system and the start signal is transmitted to the controller when the switch is turned on, and the controller having received the start signal performs start control of the AC motors. According to the configuration, one switch can be used both as the switch for starting and the switch for stopping, which forms reasonable circuit configuration.

As an example, it is preferable that the drive unit includes a first drive unit and a second drive unit, the inverters include a first inverter and a second inverter, the AC motors include a first AC motor and a second AC motor, the hydraulic pumps include a first hydraulic pump and a second hydraulic pump, the first drive unit has the first inverter, the first AC motor, and the first hydraulic pump, the second drive unit has the second inverter, the second AC motor, and the second hydraulic pump, and the controller having received the stop signal controls the first inverter and the second inverter respectively to operate the first AC motor and the second AC motor respectively during the term. Accordingly, a multifunctional working vehicle can be obtained. In the above configuration, it is preferable that, when the switch is turned off and the controller makes transition to a shutdown mode, hydraulic oil from the first hydraulic pump is not discharged to a first actuator operated in response to the first hydraulic pump, and hydraulic oil from the second hydraulic pump is not discharged to a second actuator operated in response to the second hydraulic pump. According to the configuration, it is possible to prevent respective hydraulic actuators from being operated unintentionally and the multifunctional working vehicle with improved safety as compared with related art can be obtained.

Advantageous Effects of Invention

According to the present invention, the working vehicle with improved safety in maintenance as compared with related art can be realized by performing stop control in which the AC motor is operated during the term from the point when the switch is turned off until reaching the prescribed time and is stopped afterwards.

DESCRIPTION OF EMBODIMENTS

Figure 4:
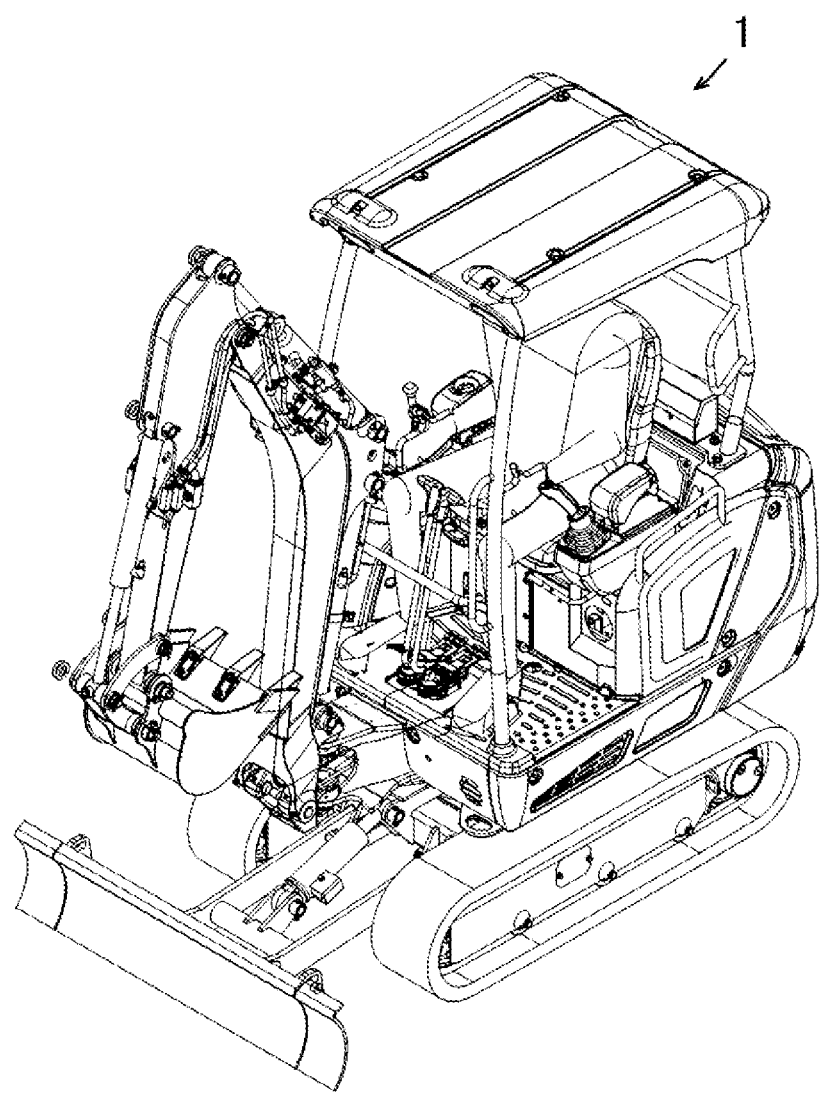
FIG. 4 is a schematic external view showing the working vehicle according to the embodiment.

Hereinafter, an embodiment of the present invention will be explained in detail with reference to the drawings. The embodiment relates to a working vehicle 1 using a battery as a power source such as a power shovel shown in FIG. 4 as an example, a skid steer loader, or a carrier, particularly relates to the working vehicle 1 in a system of being hydraulically driven by performing inverter control of the AC motor. A drive unit 3 of the working vehicle 1 is operated when power is supplied from a battery 9 and drive-controlled by a controller 4. In all drawings for explaining the embodiment, the same symbols are given to members having the same functions, and repeated explanation thereof may be omitted.

Figure 1:
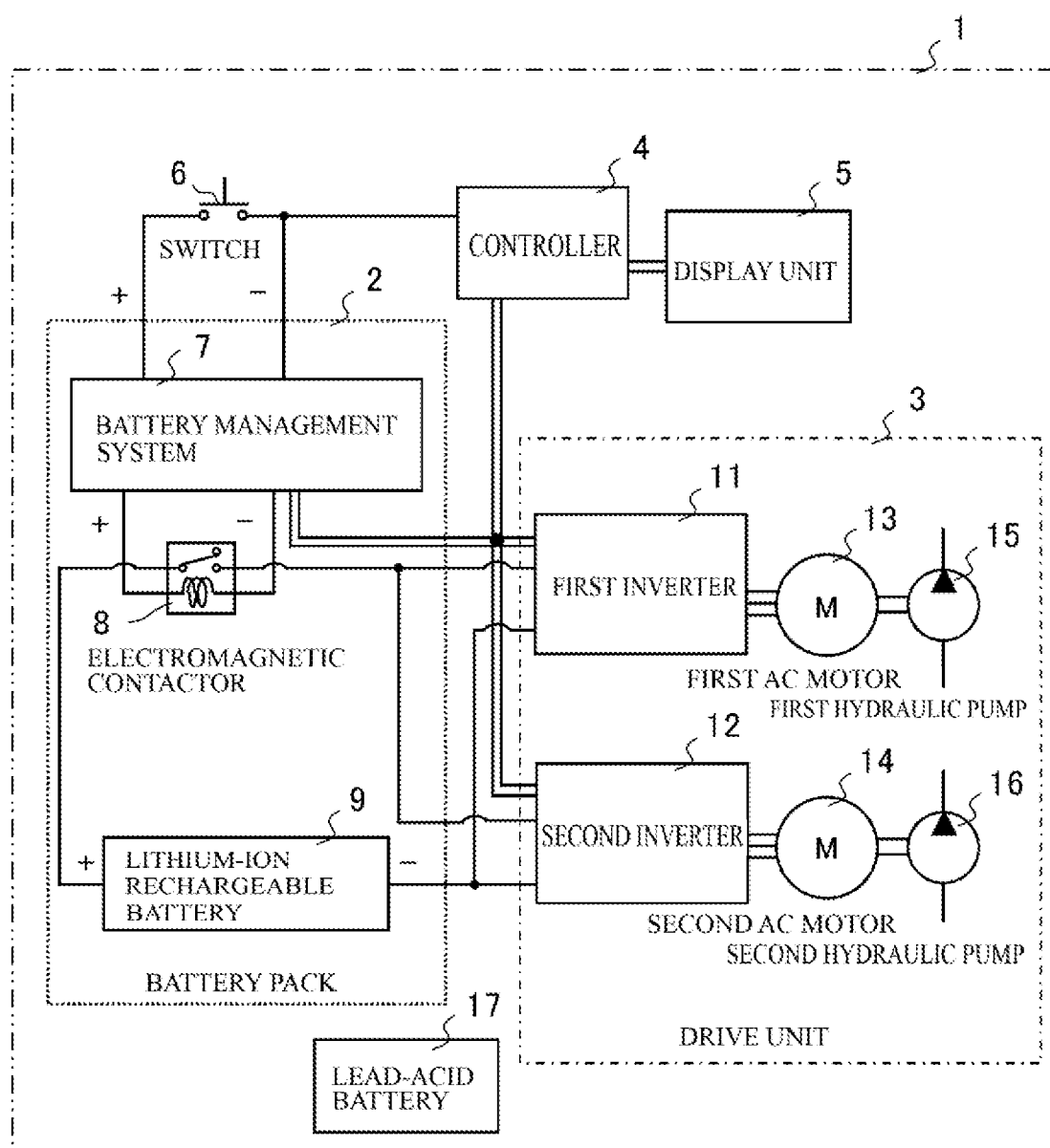
FIG. 1 is a schematic circuit diagram showing inverter control by a controller in a working vehicle according to the embodiment.

As shown in FIG. 1, the working vehicle 1 includes the battery 9 such as a lithium-ion rechargeable battery, the drive unit 3 operated when power is supplied from the battery 9, the controller 4 controlling the drive unit 3, a display unit 5 connected to the controller 4, a battery management system 7 monitoring the battery 9, an electromagnetic contactor 8 operated by control of the battery management system 7, a switch 6, and a lead-acid battery 17 supplying power to the controller 4 and the battery management system 7. The switch 6 is signal-connected to the controller 4 so as to transmit a start signal and the switch 6 is also signal-connected to the controller 4 so as to transmit a stop signal. The switch 6 is used both as switches for starting and stopping, and well-known configurations such as a key switch and a push switch can be applied. Part of components other than relevant part is not shown in a wiring diagram.

In the example of FIG. 1, a battery pack 2 is configured by the battery management system 7, the electromagnetic contactor 8, and the battery 9. The battery pack 2 is mounted to the working vehicle 1 so as to be mountable/detachable. As an example, in a case where a contact of the electromagnetic contactor 8 is welded and an operational failure occurs, the battery pack 2 is detached and replaced with new one. As another example, in a case where the battery 9 comes to the end of useful life, the battery pack 2 is detached and replaced with new one. Various sensors such as a temperature sensor for detecting the temperature of the battery 9 are built in the battery pack 2, and a wiring diagram of them is omitted.

The display unit is configured to display operation information of the drive unit 3, remaining capacity information of the battery 9, and other known vehicle information, which is configured to display a warning on a display screen when abnormality occurs and to give an alarm from a speaker when abnormality occurs.

In the example shown in FIG. 1, when the battery management system 7 controls the electromagnetic contactor 8 to be on, the electromagnetic contactor 8 forms a DC power supply circuit from the battery 9 to a first inverter 11 and a second inverter 12, and power is supplied from the battery 9 to the first inverter 11 and the second inverter 12. The battery 9 is the lithium-ion rechargeable battery with a large capacity formed by combining a large number of cells, power supply voltage of which is 70 to 600 [V] as an example.

In the example shown in FIG. 1, a first hydraulic pump 15 is operated by operating a first AC motor 13 by the first inverter 11 based on a command from the controller 4, and a second hydraulic pump 16 is operated by operating a second AC motor 14 by the second inverter 12 based on a command from the controller 4. The first AC motor 13 and the second AC motor 14 are both magnets-embedded motors (IPM motors). As an example, the first hydraulic pump 15 and the second hydraulic pump 16 are gear pumps. As an example, a plurality of actuators taking charge of main operations such as run, boom, arm, and bucket are operated by the first hydraulic pump 15. An actuator taking charge of a turning operation is operated by the second hydraulic pump 16. A configuration in which a plurality of actuators are operated by one hydraulic pump may be adopted.

An operator turns on the switch 6 when starting the working vehicle 1. When the switch 6 is turned on, a start signal is transmitted to the controller 4, and the controller 4 having received the start signal controls the first inverter 11 to start the first AC motor 13. The controller 4 having received the start signal also controls the second inverter 12 to start the second AC motor 14.

Figure 2:
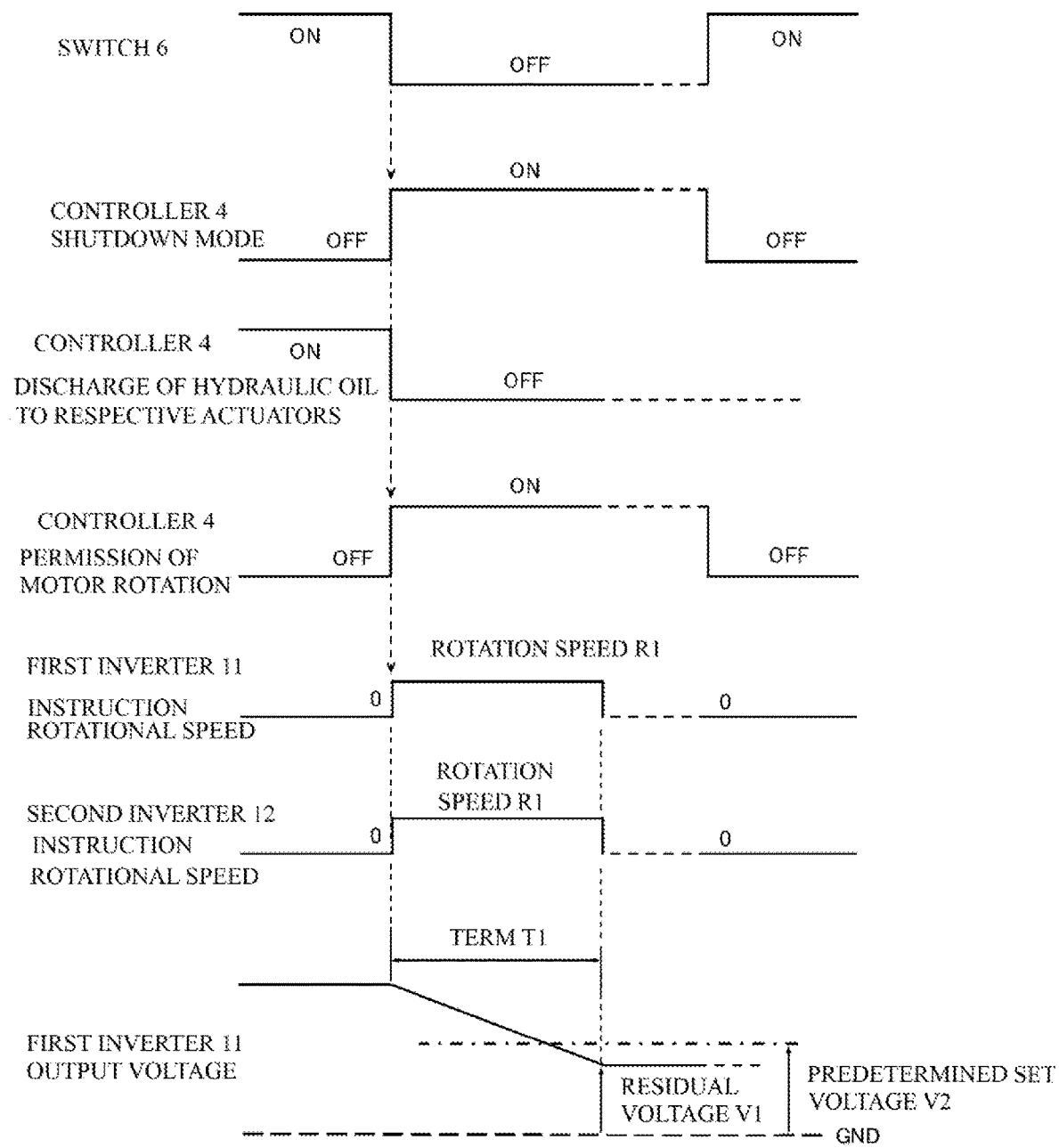
FIG. 2 is a schematic timing-chart diagram showing stop control by the controller in FIG. 1.
Figure 3:
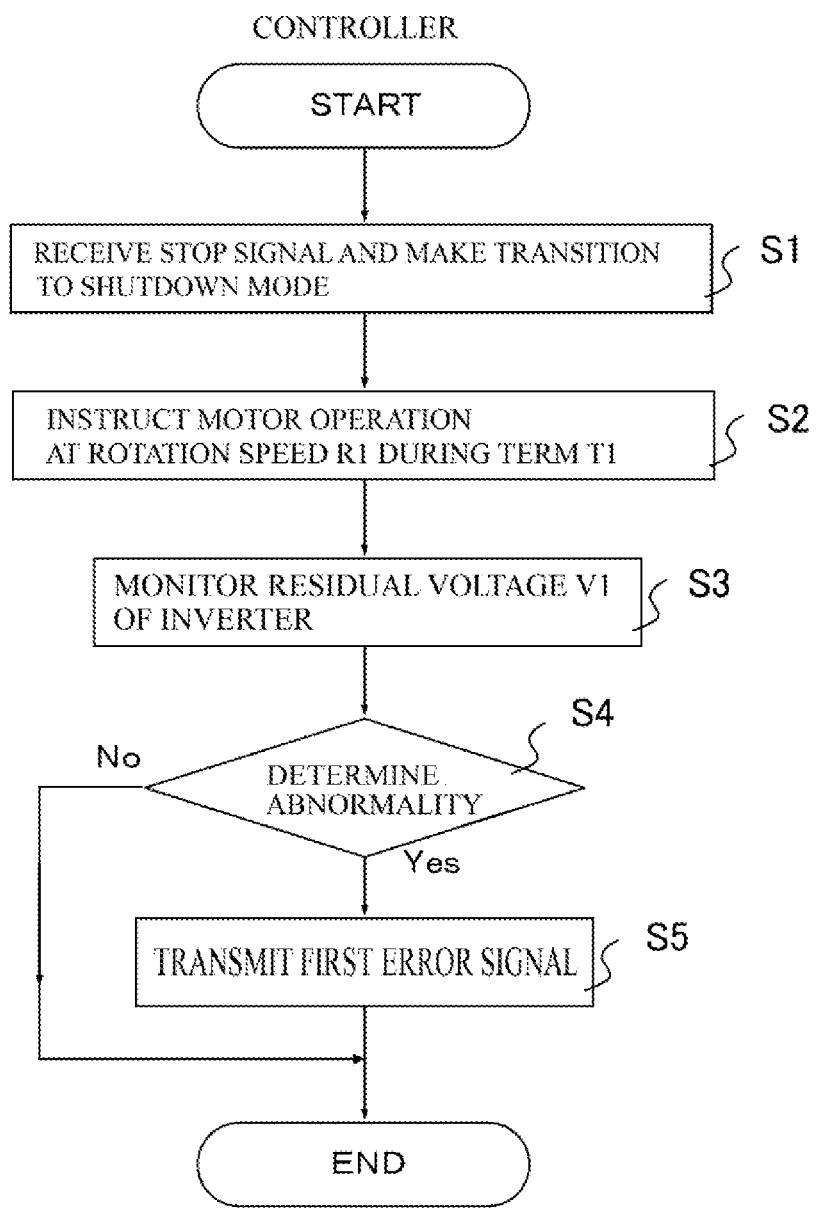
FIG. 3 is a schematic flowchart diagram showing an operation procedure of the stop control by the controller in FIG. 2.

FIG. 2 is a schematic timing-chart diagram showing stop control by the controller 4 in FIG. 1. FIG. 3 is a schematic flowchart diagram showing an operation procedure of the stop control by the controller 4 in FIG. 2. Subsequently, the operation procedure of the stop control by the controller 4 in the working vehicle 1 will be explained below.

The operator turns off the switch 6 when stopping the working vehicle 1. When the switch 6 is turned off, a stop signal is transmitted to the controller 4, and the controller 4 proceeds to Step S1 where the controller 4 receives the stop signal and makes transition to a shutdown mode. When the switch 6 is turned off and the controller 4 makes transition to the shutdown mode, hydraulic oil is not discharged from the first hydraulic pump 15 to a first actuator operating in response to the first hydraulic pump 15, and hydraulic oil is not discharged from the second hydraulic pump 16 to a second actuator operating in response to the second hydraulic pump 16.

Subsequent to Step S1, the controller 4 proceeds to Step S2 where motor operation is instructed at a rotation speed R1 during a term T1 from a point when the switch 6 is turned off until reaching a prescribed time. In Step S2, the first AC motor 13 and the second AC motor 14 rotate at the rotation speed R1 respectively during the term T1.

Subsequent to Step S2, the controller 4 proceeds to Step S3 where a residual voltage V1 in the inverter at the point when reaching the prescribed time is monitored. As an example, the controller 4 detects a quantity of electric charge stored in a capacitor disposed on an output side of the first inverter 11 at the point when reaching the prescribed time by a sensor, calculating the residual voltage V1 from the detected quantity of electric charge. In the example, a rated output of the first AC motor 13 is a larger value than a rated output of the second AC motor 14; therefore, the residual voltage V1 of the second inverter 12 can be considered to be lower than a predetermined set voltage V2 when the residual voltage V1 of the first inverter 11 is lower than the predetermined set voltage V2 which has been previously set.

Subsequent to Step S3, the controller 4 proceeds to Step S4 where occurrence of abnormality of the residual voltage V1 is determined. As an example, when the controller 4 determines that the residual voltage V1 at the point when reaching the prescribed time is lower than the predetermined set voltage V2, the controller 4 determines that the residual voltage V1 is normal to end the shutdown mode and to stop the procedure. On the other hand, when the controller determines that the residual voltage V1 at the point when reaching the prescribed time is equal to or higher than the predetermined set voltage V2, the controller 4 determines that the residual voltage V1 is abnormal and proceeds to Step S5 where an error signal is transmitted to the display unit 5.

When abnormality is determined by the controller 4, a first error signal is transmitted to the display unit 5 immediately by the controller 4 in Step S5, and the display unit 5 having received the first error signal gives first error indication. A first term during which the first error indication being displayed is previously set. As an example, the first error indication is displayed for 0.1 to 10 [seconds] when the display unit 5 is stopped.

Moreover, when abnormality is determined by the controller 4, error information is stored in a storage unit provided in the controller 4 as error history. When the display unit 5 is restarted, a second error signal based on the error information stored in the storage unit as the error history is transmitted to the display unit 5 and the display unit 5 having received the second error signal gives second error indication in Step S5. A second term during which the second error indication being displayed is previously set. As an example, the second error indication is displayed for 10 to 30 [seconds] when the display unit 5 is restarted.

According to the embodiment, the stop control in which the first AC motor 13 and the second AC motor 14 are operated during the term T1 from the point when the switch 6 is turned off until reaching the prescribed time and are stopped afterward is performed, thereby obtaining the working vehicle 1 with improved safety in maintenance as compared with related art.

The battery feeding direct current to the inverters is not limited to the above lithium-ion rechargeable battery, but secondary batteries such as a nickel-metal hydride battery, a sodium-sulfur battery, and a sulfide based battery can be adopted.

In the above working vehicle 1, specifications may be modified according to the specifications and the like. The present invention is not limited to the above-explained embodiment and may be variously modified in a range not departing from the gist of the present invention.

What is claimed is:
1. A working vehicle comprising:
 a drive unit including inverters, AC motors, and hydraulic pumps;
 a battery feeding direct current to the inverters;
 a controller signal-connected to the inverters;
 a battery management system signal-connected to the controller;
 a switch;
 an electromagnetic contactor operated by a command from the battery management system and connecting the battery to the inverters; and
 a display unit signal-connected to the controller,
 wherein the switch is signal-connected to the controller so as to transmit a stop signal,
 the electromagnetic contactor is controlled to be off by the battery management system and the stop signal is transmitted to the controller when the switch is turned off, and
 the controller having received the stop signal performs stop control in which the AC motors are operated during a term from a point when the switch is turned off until reaching a prescribed time to thereby set a residual voltage in the inverters at the point when reaching the prescribed time to be lower than a predetermined set voltage which has been previously set.

2. The working vehicle according to claim 1, wherein, when the controller determines that the residual voltage is equal to or higher than the predetermined set voltage, the controller transmits a first error signal to the display unit, and the display unit having received the first error signal displays a first error indication.

3. The working vehicle according to claim 2, wherein, when the controller determines that the residual voltage is equal to or higher than the predetermined set voltage, the controller transmits a second error signal to the display unit when the display unit is restarted, and the display unit having received the second error signal displays a second error indication.

4. The working vehicle according to claim 1, wherein the switch is signal-connected to the controller so as to transmit a start signal, the electromagnetic contactor is controlled to be on by the battery management system and the start signal is transmitted to the controller when the switch is turned on, and the controller having received the start signal performs start control of the AC motors.

5. The working vehicle according to claim 1, wherein the drive unit includes a first drive unit and a second drive unit, the inverters include a first inverter and a second inverter, the AC motors include a first AC motor and a second AC motor, the hydraulic pumps include a first hydraulic pump and a second hydraulic pump, the first drive unit has the first inverter, the first AC motor, and the first hydraulic pump, the second drive unit has the second inverter, the second AC motor, and the second hydraulic pump, and the controller having received the stop signal controls the first inverter and the second inverter respectively to operate the first AC motor and the second AC motor respectively during the term.

6. The working vehicle according to claim 5, wherein, when the switch is turned off, hydraulic oil from the first hydraulic pump is not discharged to a first actuator operated in response to the first hydraulic pump, and hydraulic oil from the second hydraulic pump is not discharged to a second actuator operated in response to the second hydraulic pump.

* * * * *